(12) United States Patent
Toh et al.

(10) Patent No.: US 7,152,665 B2
(45) Date of Patent: Dec. 26, 2006

(54) PRESSURE TANK

(75) Inventors: Keiji Toh, Kariya (JP); Hidehito Kubo, Kariya (JP); Katsuyoshi Fujita, Kariya (JP); Akiko Kumano, Kariya (JP); Masahiko Kimbara, Kariya (JP); Yoshihiro Isogai, Kariya (JP); Daigoro Mori, Mishima (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 29 days.

(21) Appl. No.: 10/841,279

(22) Filed: May 7, 2004

(65) Prior Publication Data
US 2004/0251007 A1 Dec. 16, 2004

(30) Foreign Application Priority Data
May 8, 2003 (JP) .............................. 2003-130747
May 8, 2003 (JP) .............................. 2003-130748
Mar. 10, 2004 (JP) .............................. 2004-067893

(51) Int. Cl.
*F28F 9/02* (2006.01)
(52) U.S. Cl. ........................................ 165/74; 165/158
(58) Field of Classification Search ............ 165/73–75, 165/158–163
See application file for complete search history.

(56) References Cited

U.S. PATENT DOCUMENTS

| 2,223,320 | A | * | 11/1940 | Jacocks ........................ 165/158 |
| 2,762,611 | A | * | 9/1956 | Monroe et al. ............... 165/158 |
| 2,956,704 | A | * | 10/1960 | Boni, Jr. ....................... 165/158 |
| 3,301,321 | A | * | 1/1967 | Poore ........................... 165/158 |
| 3,768,550 | A | * | 10/1973 | Williamson et al. ......... 165/158 |
| 4,029,145 | A | * | 6/1977 | Pfouts et al. ................ 165/161 |
| 4,589,478 | A | * | 5/1986 | Wunder ....................... 165/158 |
| 4,871,014 | A | * | 10/1989 | Sulzberger .................. 165/160 |
| 5,823,251 | A | * | 10/1998 | Romero ....................... 165/158 |
| 6,206,086 | B1 | * | 3/2001 | McKey ....................... 165/158 |

FOREIGN PATENT DOCUMENTS

| JP | 2000-504810 | 4/2000 |
| JP | 2000-249425 | 9/2000 |
| WO | WO 97/28401 | 8/1997 |

* cited by examiner

*Primary Examiner*—Teresa J. Walberg
(74) *Attorney, Agent, or Firm*—Morgan & Finnegan LLP

(57) ABSTRACT

A pressure tank includes a liner separated into a cap and a main body. A shell covers the outer surface of the liner. The shell is formed of a fiber reinforced plastic. A heat exchanger is arranged in the liner. A header is connected to the heat exchanger. The heat exchanger is supported on the liner by fastening the header to the cap or the main body.

7 Claims, 8 Drawing Sheets

PRESSURE TANK

BACKGROUND OF THE INVENTION

The present invention relates to a pressure tank;

Recent years have seen the development of hydrogen engine automobiles and electric fuel cell automobiles to reduce the amount of carbon dioxide emitted from vehicles. In electric fuel cell automobiles, power is generated by electrochemical reaction of hydrogen and oxygen. The power is supplied to the motor to produce motive power. A pressure tank for the storage of hydrogen is generally installed in electric fuel cell vehicles. An example of such a pressure tank is disclosed in Japanese National Phase Laid-Open Patent Publication No. 2000-504810. The pressure tank disclosed in Japanese National Phase Laid-Open Patent Publication No. 2000-504810 is provided with a metal or resin liner and a shell. The shell covers the outer surface of the liner and functions to ensure pressure resistance of the pressure tank.

In general, when gas is charged into a pressure tank, the temperature within the pressure tank rises due to the compression heat of the gas. When the shell is formed of a carbon fiber reinforced plastic (CFRP), the heat within the pressure tank is not radiated to the exterior due to the poor heat conductance of the CFRP. The amount of gas that can be charged into the pressure tank decreases as the temperature within the pressure tank increases. Particularly, when gas is quickly charged into the pressure tank, the temperature within the pressure tank rises significantly. As a result, a sufficient amount of gas cannot be loaded into the pressure tank.

One means for increasing the amount of gas that may be charged into a pressure tank is to accommodate an absorption material, which is capable of absorbing gas and releasing the absorbed gas, in the pressure tank. Such a material includes, for example, a hydrogen absorption alloy (metal hydrate) capable of absorbing hydrogen and releasing the absorbed hydrogen. The hydrogen absorption reaction by a hydrogen absorption alloy is an exothermic reaction. Accordingly, when a hydrogen absorption alloy is used, the heat generated by the hydrogen absorption reaction is added to the compression heat. This fact must be considered when designing the pressure tank.

A pressure tank is generally provided with a heat exchanger for maintaining the temperature in the pressure tank within a predetermined temperature range. The heat exchanger exchanges heat between the interior of the pressure tank and a heat transfer medium, which circulates within a heat transfer tube, to maintain the temperature in the pressure tank within a predetermined range. In conventional pressure tanks, the heat transfer tube extends through the liner of the pressure tank out of the pressure tank. In order to ensure the hermetic seal of the pressure tank, the heat transfer tube is brazed or welded to the liner. However, the brazing or welding of the heat transfer tube to the liner reduces the strength of the liner strength, and particularly, the fatigue strength. Therefore, conventional pressure tanks do not have satisfactory durability.

Japanese Laid-Open Patent Publication No. 2000-249425 discloses first and second pressure tanks incorporating heat exchangers. The first pressure tank has a heat insulation case accommodating the heat exchanger and hydrogen absorption alloy. The heat insulation case is supported in the pressure tank by a support member, which contacts the interior surface of the pressure tank in points or in a linear mariner. The second pressure tank is provided with a stainless steel container 151 and a housing case 152, which is accommodated in the container 151, as shown in FIG. 12. The housing case 152, which has a plurality of fine holes 152a, accommodates a heat exchanger 153 and hydrogen absorption alloy powder. A gas permeable heat insulation material 154, such as glass wool, is arranged in the space defined between the inner surface of the container 151 and the outer surface of the housing case 152. The heat exchanger 153 includes a heat transfer tube 155, through which a heat transfer medium is circulated, and a plurality of fins 156. The heat transfer tube 155 extends through the housing case 152 and is supported at opposite ends of the container 151. That is, the housing case 152 and the hydrogen absorption alloy are supported by the container 151 through the heat transfer tube 155.

The pressure tank is installed into electric fuel cell automobiles and hydrogen engine automobiles as a hydrogen storage tank for storing hydrogen fuel. In this case, it is desirable that the hydrogen capacity of the pressure tank be as large as possible. It is further desirable that the weight of the pressure tank be as light as possible. The hydrogen absorption alloy significantly increases the hydrogen capacity of the pressure tank. However, the hydrogen absorption alloy expands when absorbing hydrogen. Therefore, the pressure tank must have sufficient strength to withstand the added stress caused by the expansion of the hydrogen absorption alloy. This leads to an increase in the weight of the pressure tank.

One means of eliminating this problem is to support only one end or two ends of a hydrogen absorption unit, which is provided with a heat exchange function and includes a hydrogen absorption alloy, with the pressure tank. In this case, the pressure in the pressure tank may be adjusted regulate the amount of hydrogen charged into the empty space of the pressure tank. However, when only one end or two ends of the hydrogen absorption unit is supported by the pressure tank, a large load is applied to the portion of the hydrogen absorption unit supported by the pressure tank and the portion of the pressure tank supporting the hydrogen absorption unit. These portions must be reinforced. However, this would increase the weight of the pressure tank instead of reducing the weight of the pressure tank.

In the first pressure tank disclosed in Japanese Laid-Open Patent Publication No. 2000-249425, stress tends to be concentrated at certain portions of the pressure tank during the expansion of the hydrogen absorption alloy because of the point contact or linear contact of the support member relative to the interior surface of the pressure tank. In the case of the second pressure tank shown in FIG. 12, the heat insulation material 154 is used for insulating heat and not for supporting the housing case 152. Assuming that the housing case 152 is to be supported by the heat insulation material 154, the heat insulation material 154 would have to be filled into the space defined between the outer surface of the housing case 152 and the inner surface of the container 151 to the extent that there would be no space for charging hydrogen.

SUMMARY OF THE INVENTION

It is an object of the present invention to provide a pressure tank having satisfactory strength and hermetic seal. A further object of the present invention is to provide a light pressure tank having sufficient capacity.

To achieve the above object, the present invention provides a pressure tank including a hollow liner. The liner is separable into at least two separate bodies. A shell covers the outer surface of the liner. The shell is formed of a fiber reinforced plastic. A heat exchanger is arranged in the liner. A header is connected to the heat exchanger. The heat exchanger is supported on the liner by fastening the header to one of the separate bodies.

A further aspect of the present invention is a pressure tank including a hollow liner. The liner is separable into a main body having an opening and a cap for closing the opening. The cover has a thick portion. A shell covers the outer surface of the liner. The shell is formed of a fiber reinforced plastic. A heat exchanger is arranged in the liner. The heat exchanger includes a heat transfer tube for circulating a heat transfer medium in the tube. The heat exchanger is supported by the liner by fastening the heat transfer tube to the thick portion of the cap.

A further aspect of the present invention is a pressure tank including a hollow tank body. An assembly is provided with a heat exchange function and arranged in the tank body. The assembly has an axis and has a first end and a second end in the axial direction of the assembly. A support member is arranged in the tank body. The support member is in contact with an inner surface of the tank body and an outer surface of the assembly between the first end and the second end both inclusive to support the assembly. The support member has an air hole passing through the support member.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4(*b*) is an enlarged cross-sectional view showing part of the hydrogen storage tank of FIG. 4(*a*);

DETAILED DESCRIPTION OF THE PREFERRED EMBODIMENTS

A first embodiment of the present invention will now be described with reference to FIGS. 1 and 2.

Figure 1:
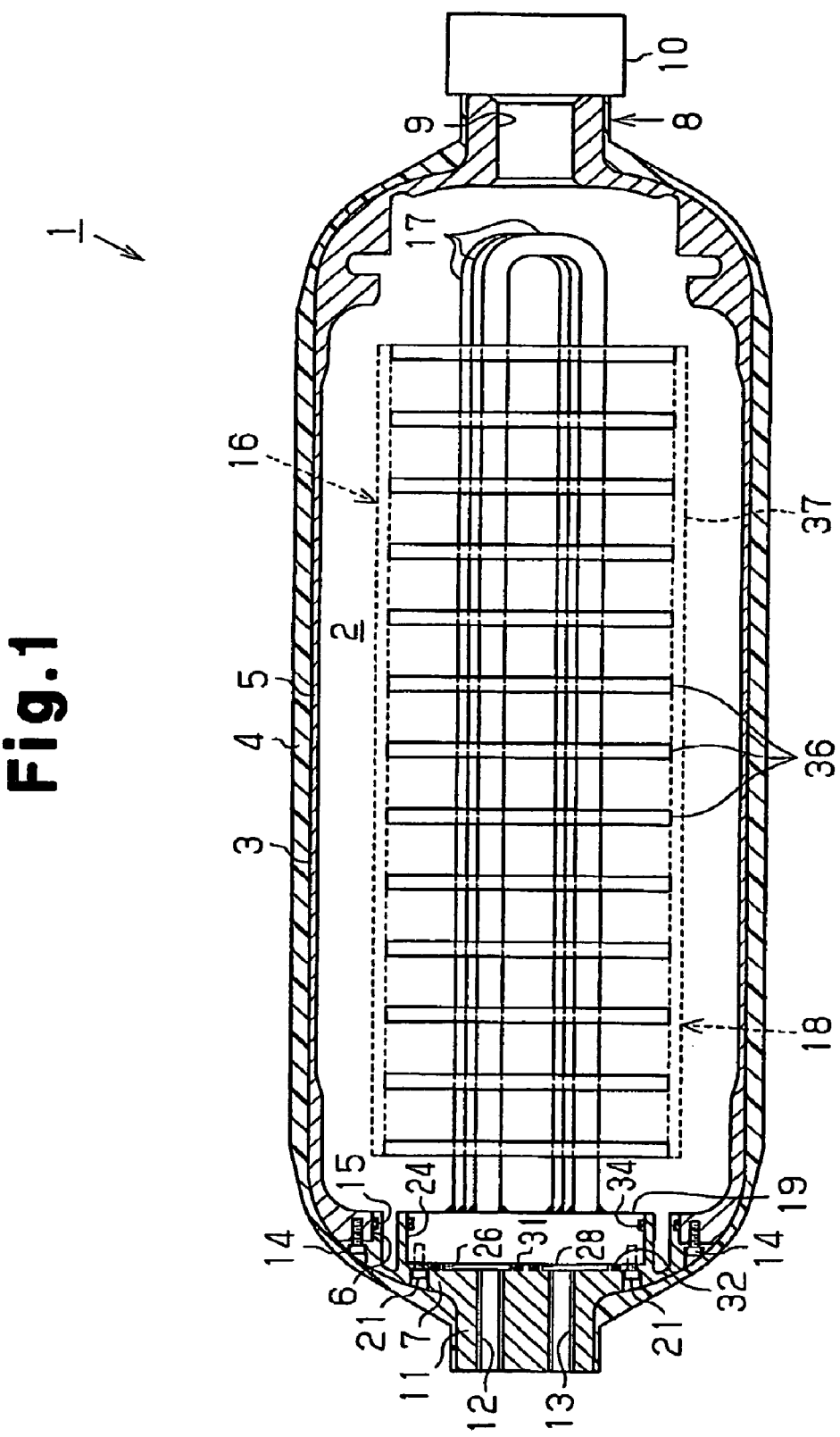
FIG. 1 is a cross-sectional view of a hydrogen storage tank according to a first embodiment of the present invention.

The hydrogen storage tank 1 shown in FIG. 1 is an elongated cylindrical pressure tank. As viewed in FIG. 1, the right end of the tank 1 defines a distal end and the left end of the tank 1 defines a basal end. An accommodation chamber 2 is defined in the tank 1 to accommodate hydrogen gas in a high pressure state. The amount of hydrogen that may be accommodated in the accommodation chamber 2 is increased by increasing the pressure in the accommodation chamber 2. For example, when the pressure within the accommodation chamber 2 is set at 25 MPa, approximately 250 times the amount of hydrogen may be accommodated within the accommodation chamber 2 compared to when the interior pressure is set at atmospheric pressure.

The tank 1 includes a hollow liner 3, which is generally cylindrical, and a shell 4, which substantially covers the entire outer surface of the liner 3. The interior of the liner 3 defines the accommodation chamber 2. The shell 4 is formed of carbon fiber reinforced plastic (CFRP) and functions to ensure the durability (mechanical strength) of the tank 1. The shell 4 is formed over the liner 3 through a filament winding (FW) process. In the FW process, carbon fiber impregnated with a thermosetting resin, such as unsaturated polyester resin, epoxy resin and the like, is wound on the rotating liner 3 so as to have a helical winding layer and a hoop winding layer. Then, the resin with which the carbon fiber has been impregnated is solidified.

The liner 3 is formed of a metal such as aluminum alloy or the like and functions to ensure the hermetic seal of the tank 1. The liner 3 has a generally cylindrical main body 5, which has an opening 6, and a cap 7, which for closing the opening 6 of the main body 5. The opening 6 is located at the portion of the main body 5 corresponding to the basal end of the tank 1. A gas passage 9, which connects the accommodation chamber 2 to the exterior, is provided at the distal end 8 of the liner 3. A valve 10 is connected Lo the gas passage 9. The tank 1 is switched between a state in which the discharge of hydrogen is permitted from the accommodation chamber 2 through the gas passage 9 and a state in which hydrogen is permitted to be charged into the accommodation chamber 2 through the gas passage 9 by switching ports of the valve 10.

A thick neck 11 (thick portion) is provided in the center of the cap 7. The neck 11 is provided with two passages 12 and 13, which connect the accommodation chamber 2 to the exterior. The passages 12 and 13 extend parallel to each other. The cap 7 is fixed to the main body 5 by a plurality (for example, eight) screws 14 arranged at equal angular intervals along the peripheral portion of the cap 7. A seal 15 is arranged between the main body 5 and the cap 7 to ensure the hermetic seal of the accommodation chamber 2.

A heat exchange unit 16 is accommodated in the accommodation chamber 2 to control temperature fluctuation within the tank 1 when charging hydrogen into the accommodation chamber 2 and discharging hydrogen from the accommodation chamber 2. The heat exchange unit 16 includes a heat exchanger 18, which has a plurality (three in the present embodiment) of heat transfer tubes 17, and a generally disk-shaped header 19. Each heat transfer tube 17 is formed from a pipe bent into a U-shape. The ends of each heat transfer tube 17 are fixed to the header 19 by performing soldering or welding. The heat transfer tubes 17 are arranged in the radial direction of the tank 1.

The heat exchange unit 16 is connected to the cap 7 by the header 19. Referring to FIG. 2, the header 19 is fitted into a receptacle 24 formed in the inner surface of the cap 7. The receptacle 24 is connected to the passages 12 and 13. The cap 7 has a thin portion 20 having through holes 22 formed at equal angular intervals around the neck 11. Screw holes 23 are provided in the surface of the header 19 facing towards the cap 7 at portions corresponding to the through holes 22. The heat exchange unit 16 is connected to the cap 7 by screwing screws 21 into the screw holes 23 through the through holes 22. The screws 21, the through holes 22 and the screw holes 23 form an engaging mechanism.

The temperature in the tank 1, that is, the temperature in the accommodation chamber 2, increases when hydrogen is charged into the accommodation chamber 2 and decreases when hydrogen is discharged from the accommodation chamber 2. In order to minimize temperature fluctuation, cold water flows through the heat transfer tubes 17 when charging hydrogen, and warm water flows through the heat transfer tubes 17 when discharging hydrogen. The cold water and the warm water, which function as heat transfer media, circulates in each heat transfer tube 17 from one end to the other end. Among the two ends of each heat transfer tube 17, the end located on the upper side of FIG. 1 serves as an upstream end 17a and the end located at the lower side of FIG. 1 serves as a downstream end 17b.

Figure 2:
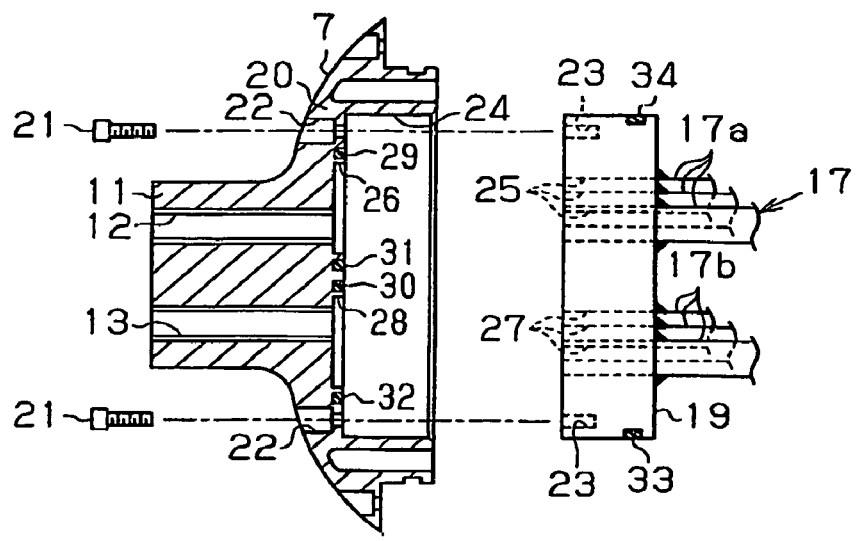
FIG. 2 is an exploded, partial cross-sectional view showing a connected portion of a heat exchange unit and a cap in the tank of FIG. 1.

As shown in FIG. 2, flow passages 25 extend through the header 19 in a direction perpendicular to the end face of the header 19 at locations corresponding to the upstream end 17a of each heat transfer tube 17. The flow passages 25 extend substantially parallel to each other. The inner diameter of each flow passage 25 is substantially the same as the inner diameter of the corresponding heat transfer tube 17. A communication passage 26 connects the passage 12 to the three flow passages 25. The communication passage 26 is defined by the part of the passage 12 that is proximate to the receptacle 24 and has an inner diameter greater than that of the other parts of the passage 12.

Similarly, flow passages 27 extend through the header 19 in a direction perpendicular to the end face of the header 19 at locations corresponding to the downstream end 17b of each heat transfer tube 17. The flow passages 27 extend substantially parallel to each other. The inner diameter of each flow passage 27 is substantially the same as the inner diameter of the corresponding heat transfer tube 17. A communication passage 28 connects the passage 13 to the three flow passages 25. The communication passage 28 is defined by the part of the passage 13 that is proximate to the receptacle 24 and has an inner diameter greater than that of the other parts of the passage 13.

Annular grooves 29 and 30 respectively extend around the communication passages 26 and 20 in the inner surface of the cap 7. Seal rings 31 and 32 for ensuring the hermetic seal of the accommodation chamber 2 relative to the heat transfer tubes 17 are respectively arranged in the grooves 29 and 30. A groove 33 extends along the entire circumferential surface of the header 19. A seal ring 34 for ensuring the hermetic seal of the accommodation chamber 2 relative to the exterior is arranged in the groove 33.

As shown in FIG. 1, the heat exchange unit 16 is accommodated within the accommodation chamber 2 with the header 19 fitted in the receptacle 24. The heat exchanger 18 includes fins 36 arranged at equal intervals along the longitudinal direction of the tank 1. Each fin 36 is generally disk-shaped and is fixed to the heat transfer tubes 17. Hydrogen absorption alloy powder (metal hydride powder) (not shown) is arranged in the gaps between adjacent fins 36. Some of the metal hydride powder is in contact with the fins 36 and contributes to minimizing temperature fluctuation in the tank 1. A filter 37, through which hydrogen passes, covers the fins 36 and holds the metal hydride powder between the fins 36.

When the hydrogen is discharged from the accommodation chamber 2 of the tank 1 through the gas passage 9, the metal hydride powder discharges hydrogen through a hydrogen discharge reaction. In this state, since the hydrogen discharge reaction is an endothermic reaction, the temperature of the metal hydride powder decreases. However, when the hydrogen is discharged from the accommodation chamber 2, warm water is supplied through the passage 12 to the heat transfer tubes 17. As a result, the heat of the warm water circulated in the heat transfer tubes 17 moves to the metal hydride powder through the fins 36. In this way, temperature decrease of the metal hydride powder is suppressed.

When the hydrogen is charged into the accommodation chamber 2 of the tank 1 through the gas passage 9, the metal hydride powder absorbs the hydrogen through a hydrogen absorption reaction. This time, since the hydrogen absorption reaction is an exothermic reaction, the temperature of the metal hydride powder increases. However, when the hydrogen is charged into the accommodation chamber 2, cold water is supplied through the passage 12 to the heat transfer tubes 17. As a result, the heat of the metal hydride powder is transferred through the fins 36 to the cold water circulated in the heat transfer tubes 17. In this way, the temperature increase of the metal hydride powder is suppressed.

A series of processes performed to manufacture the tank 1 will now be described.

First, the heat transfer tubes 17, the fins 36, the filter 37, and the heat exchanger 18, which contains the metal hydride powder, are prepared. The upstream ends 17a and downstream ends 17b of the heat transfer tubes 17 are aligned with the associated flow passages 25 and 27 of the header 19 and then brazed or welded to the header 19. In this way, the heat exchanger 18 and the header 19 are integrated to form the heat exchange unit 16.

Then, the seal rings 31 and 32 are respectively arranged in the grooves 29 and 30 of the cap 7. The seal ring 34 is arranged in the groove 33 of the header 19. After the header 19 is fitted into the receptacle 24, the heat exchange unit 16 is fastened to the cap 7 by the screws 21. Then, the opening 6 of the main body 5 is closed with the cap 7, to which the heat exchange unit 16 is connected. The cap 7 is fixed to the main body 5 with the screws 14. In this way, after obtaining the liner 3 incorporating the heat exchange unit 16, a filament winding device (not shown) is used to wind carbon fibers impregnated with a thermosetting resin around the liner 3. After the winding, the resin impregnating the carbon fiber is hardened to form the shell 4, which is made of CFRP, on the liner 3.

The present embodiment has the advantages described below.

(1) In the tank 1 of FIG. 1, the heat transfer tubes 17 are not drawn out of the liner 3 even though the heat exchange unit 16 incorporates the liner 3. This is because the heat transfer tubes 17 are fixed to the header 19 through brazing or welding, and the header 19 is fastened to the liner 3 (cap 7) by the screws 21. If the heat transfer tubes 17 were to be drawn out of the liner 3, the heat transfer tubes 17 would have to be brazed or welded to the liner 3 to ensure the hermetic seal of the tank 1. However, this would reduce the strength of the liner 3. In contrast, since the heat transfer tubes 17 are neither brazed nor welded to the liner 3 in the tank 1 of FIG. 1, the strength of the liner 3 caused by brazing or welding the heat transfer tubes 17 to the liner 3 is prevented from being reduced.

(2) In the tank 1 of FIG. 1, the heat transfer tubes 17 do not project out of the liner 3. Accordingly, there is no interference when forming the shell 4 through the FW process.

(3) The heat exchanger 18 is connected to the cap 7 by the header 19. Therefore, if a different type of heat exchanger is connected to the cap 7 instead of the heat exchanger 18, the design of the cap 7 does not have to be changed by modifying the structure of the header 19, for example, by modifying the number or internal diameter of the flow passages 25 and 27.

(4) Since the liner 3 is separable into the main body 5 and the cap 7, the heat exchanger 18 may easily be incorporated in the liner 3.

(5) The heat exchange unit 16 is easily fastened to the cap 7 by the screws 21. Accordingly, the fastening of the heat exchange unit 16 to the cap 7 is simple.

(6) The seal rings 31, 32, and 33 are arranged between the surfaces of the cap 7 and the header 19. This prevents the hydrogen in the accommodation chamber 2 from entering the heat transfer tubes 17 and the flow passages 12 and 13 and improves the hermetic seal of the accommodation chamber 2.

(7) Although not shown in the drawings, devices for supplying and recovering the heat transfer media are connected to the tank 1 through an ingoing tube connected to the flow passage 12 and an outgoing tube connected to the flow passage 13. The flow passages 12 and 13 are provided in the cap 7. Thus, the entrance and exit of the heat transfer media are performed at the basal end of the tank 1. Accordingly, the ingoing and outgoing tubes may be arranged in a manner symmetric to each other.

(8) In the tank 1 shown in FIG. 1, the inlet and outlet ports of the heat transfer tubes 17 for the heat transfer media are arranged in the basal end of the tank 1, and the inlet and outlet ports of the accommodation chamber 2 for hydrogen are arranged in the distal end of the tank 1. The structure of the tank 1 would be complicated if the inlet and outlet ports for both the hydrogen and the heat transfer media were located at only one of the basal and distal ends of the tank 1. In comparison, the tank 1 shown in FIG. 1 has a relatively simple structure.

(9) The heat exchanger 18 has a plurality of the heat transfer tubes 17. Therefore, the heat exchanger 18 has a higher heat transfer capability than a heat exchanger having only one heat transfer tube. This effectively suppresses temperature fluctuation in the tank 1.

(10) The heat exchanger 18 and the header 19 are aligned in the longitudinal direction of the tank 1. Therefore, the tank 1 is relatively compact in the radial direction of the tank 1.

A second embodiment of the present invention will now be described below with reference to FIG. 3.

Figure 3:
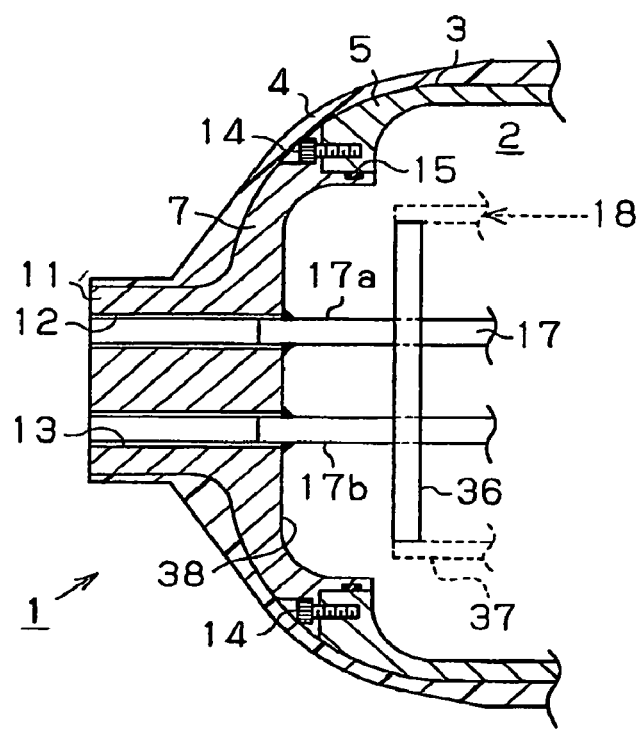
FIG. 3 is a cross-sectional view of a basal end of a hydrogen storage tank according to a second embodiment of the present invention.

The tank 1 of the second embodiment shown in FIG. 3 is identical to the tank 1 of the first embodiment shown in FIGS. 1 and 2 with the exception for one part. Among the components of the tank 1 shown in FIG. 3, the components differing from those of the tank 1 shown in FIGS. 1 and 2 are described below. Like or same reference numerals are given to those components that are the same as the corresponding components of the first embodiment. Such components will not be described in detail below.

In the tank 1 of FIG. 3, the heat exchanger 18 is connected directly to the cap 7 without using the header 19. The heat exchanger 18 has a single heat transfer tube 17. The upstream end 17a and the downstream end 17b of the heat transfer tube 17 are respectively aligned with through passages 12 and 13 and then fixed to the inner surface of the cap 7 through brazing or welding. A recess 38 is provided in the inner surface of the cap 7.

In addition to advantages (4), (7), and (8) of the first embodiment, the second embodiment has the advantage listed below.

(11) The cap 7 is fixed to the heat transfer tube 17 at the neck 11 through brazing or welding. Since the neck 11 is thick, the strength of the liner 3 is not much affected in the tank 1 of FIG. 3 even though the heat transfer tube 17 is brazed or welded to the liner 3 (cap 7). Furthermore, in the tank 1 of FIG. 3, the heat transfer tube 17 does not project out of the liner 3. Accordingly, there is no interference when forming the shell 4 though the FW process.

A third embodiment of the present invention is described below with reference to FIGS. 4(a) and 4(b).

Figure 4A:
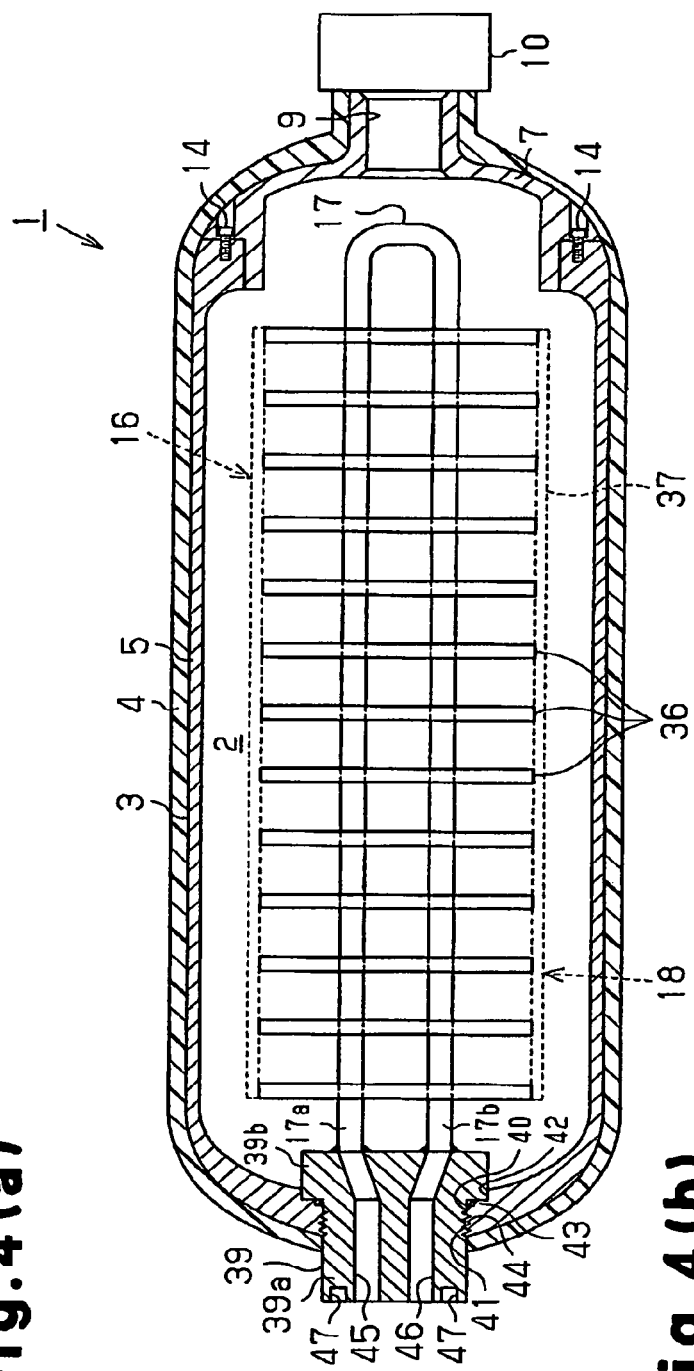
FIG. 4(*a*) is a cross-sectional view of a hydrogen storage tank according to a third embodiment of the present invention.
Figure 4B:
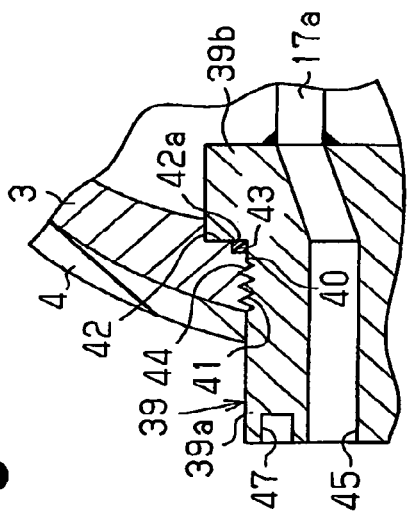

The third embodiment of the tank 1 shown in FIG. 4(a) has a structure similar to that of tank 1 of the first embodiment shown in FIGS. 1 and 2 with the exception that a part is omitted. Among the parts of the tank 1 shown in FIG. 4(a), parts which differ from the parts of the tank 1 shown in FIGS. 1 and 2 are described below, and parts which are identical or similar to those of the first embodiment are referenced by identical reference numbers and further description of these parts is omitted.

In the tank 1 shown in FIG. 4(a), the heat exchange unit 16 is connected to the main body 5 and not to the cap 7. The cap 7 covers an opening of the main body 5 at the distal end of the tank 1 and not the basal end of the tank 1. A gas passage 9, which connects the accommodation chamber 2 to the exterior, extends through the cap 7. A valve 10 is connected to the gas passage 9.

A mounting hole 40 is provided in the basal end of the main body 5. A header 39 of the heat exchange unit 16 is connected to the main body 5 in the mounting hole 40. As shown in FIGS. 4(a) and 4(b), a female thread 41 is provided on the surface of the main body 5 (liner 3) that defines the mounting hole 40. An annular recess 42, which extends continuously from the mounting hole 40, is formed in the inner surface of the main body 5. An indentation 42a is formed in the main body 5 at a portion corresponding to the boundary between the mounting hole 40 and the annular recess 42. A seal ring 43 is arranged in the indentation 42a.

The header 39 is formed of a metal such as aluminum alloy or the like. The header 39 includes a small diameter portion 39a, which has a diameter substantially the same as the diameter of the mounting hole 40, and a large diameter portion 39b, which has a diameter that is larger than the diameter of the mounting hole 40. The diameter of the large diameter portion 39b is also smaller than the inner diameter of the annular recess 42 and larger than the inner diameter of the indentation 42a. A male thread 44, for engaging the female thread 41, is formed on the circumferential surface of the small diameter portion 39a. The header 39 is fixed to the liner 3 by inserting the small diameter portion 39a into the mounting hole 40 and engaging the male thread 44 with the female thread 41.

Passages 45 and 46 for the heat transfer media are provided in the header 39. The heat exchanger 18 has a single heat transfer tube 17. The upstream end 17a and the downstream end 17b of the heat transfer tube 17 are respectively aligned with the through passages 45 and 46. Then, the heat transfer tube 17 is fixed to the header 39 through brazing or welding. A plurality (for example, two) of concavities 47 are formed in the distal end of the small diameter portion 39a. The concavities 47 are used to engage a tool (not shown) when mounting the heat exchange unit 16 to the liner 3.

When manufacturing the tank 1 shown in FIG. 4(a), first, the heat exchanger 18 is prepared. Then, the header 39 is fixedly to the heat transfer tube 17 of the heat exchanger 18 though brazing or welding. In this way, the heat exchanger 18 and the heat transfer tube 17 are integrated to form the heat exchange unit 16.

Next, the seal ring 43 is arranged at the stepped surface between the small diameter portion 39a and the large diameter portion 39b of the header 39. The small diameter portion 39a is inserted into the mounting hole 40 of the main body 5. When the small diameter portion 39a is inserted in the mounting hole 40, a tool (not shown) engages the concavities 47 of the small diameter portion 39a. The header 39 is then rotated relative to the main body 5 with the tool. This engages the male thread 44 of the small diameter portion 39a with the female thread 41 of the main body 5 and fixes the heat exchange unit 16 to the main body 5. In this state, the seal ring 43, which has been arranged in the header 39, is accommodated in the indentation 42a in close contact with both the main body 5 and the header 39. This seals the space between the main body 5 and the header 39.

After the heat exchange unit 16 is connected to the main body 5, the cap 7 is fastened to the main body 5 with the screws 14. In this way, the liner 3 incorporating the heat exchange unit 16 is obtained. Then, carbon fibers, which have been impregnated with a thermosetting resin, is wound on the liner 3 using a filament winding device (not shown). After the winding, the resin, which impregnates the carbon fibers, is solidified to form the shell 4, which is made of CFRP, on the liner 3.

In addition to advantages (1), (7), and (8) of the first embodiment, the third embodiment has the advantages listed below.

(12) The header 39 not only functions as part of the heat exchange unit 16 but also fulfills the function of the neck 11 in the tank 1 of FIG. 1. Since the heat transfer tube 17 does not project out of the liner 3 in the tank 1 of FIG. 4(a), there is no interference when forming the shell 4 through the FW process. Furthermore, only one seal ring is used in the tank 1 of FIG. 4(a). This is less the tank 1 of FIG. 1, which uses four seal rings.

(13) Since the pressure within the accommodation chamber 2 is greater than atmospheric pressure, a force pushing the header 39 outward from the accommodation chamber 2 normally acts on the header 39, which is connected to the liner 3. The force strongly presses the seal ring 43 between the header 39 and the liner 3. This improves the sealing of the space between the header 39 and the liner 3 with the seal ring 43.

(14) Even if a different type of heat exchanger is connected to the main body 5 instead of the heat exchanger 18, the design of the main body 5 does not have to be changed by modifying the structure of the header 39, for example, by changing the number or internal diameter of the passages 45 and 46.

(15) Although the header 39 is rotated relative to the main body 5 using a tool when connecting the heat exchange unit 16 to the main body 5, the tool does not directly contact the heat exchanger 18. Therefore, excessive force is not applied to the heat exchanger 18 when mounting the heat exchange unit 16. Furthermore, the heat exchange unit 16 is easily connected to the main body 5 by inserting the small diameter portion 39a of the header 39 into the mounting hole 40 while rotating the header 39 relative to the main body 5.

The first through third embodiments may be modified as described below.

Figure 5:
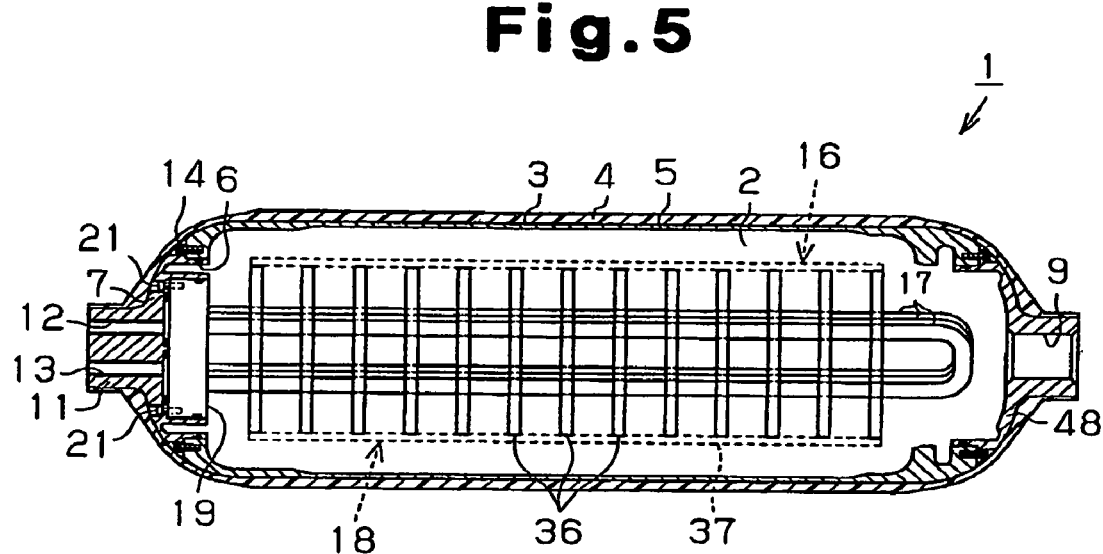
FIG. 5 is a cross-sectional view showing a hydrogen storage tank according to a further embodiment of the present invention.

As shown in FIG. 5, in addition to the cap/closing the opening of the main body 5 in the basal end of the tank 1, the tanks 1 shown in FIGS. 1 and 3 may also be provided with a cap 48 for closing the opening of the main body 5 at the distal end of the tank 1.

Figure 6:
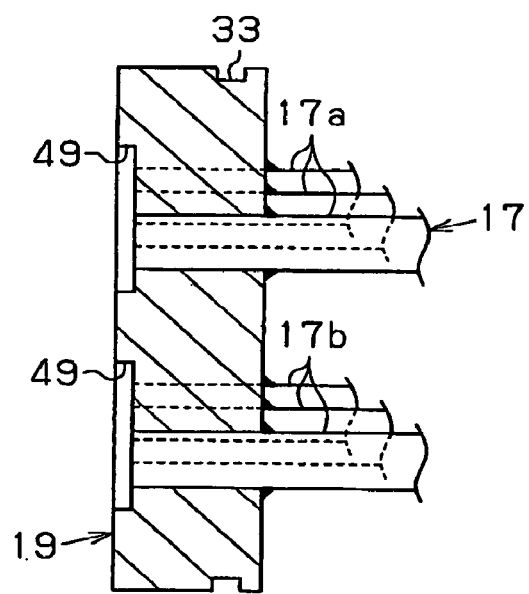
FIG. 6 is a cross-sectional view of a header in the hydrogen storage tank according to a further embodiment of the present invention.

In the tank 1 shown in FIG. 1, the communication passage 26 may be omitted and in place of the communication passage 26, a concavity 49 may be formed in the header 19 to connect the three flow passages 25 with the passage 12 of the cap 7, as shown in FIG. 6. In the tank shown in FIG. 1, the communication passage 28 may be omitted and in place of the communication passage 28, a concavity 49 may be formed in the header 19 to connect the three flow passages 27 with the passage 13 of the cap 7, as shown in FIG. 6.

In the tank 1 of FIG. 1, instead of connecting all three flow passages 25 to the passage 12, the three flow passages 25 may each be connected to a different passage extending through the cap 7. In the tank 1 of FIG. 1, instead of connecting all three flow passages 27 to the passage 13, the three flow passages 27 may each be connected to a different passage extending through the cap 7.

In the tank 1 of FIG. 1, the fastening of the heat exchange unit 16 to the cap 7 may be performed by means other than the thread engagement. For example, the heat exchange unit 16 may be fastened to the cap 7 by providing separate engagement portions for the cap 7 and the header 19 and engaging the two engagement portions.

In the tank 1 shown in FIG. 1, the cap 7 may be formed of resin instead of metal. A resin cap 7 is more heat insulative than a metal cap 7 and suppresses heat transfer between the exterior and the heat transfer media when the heat transfer media passes through the through passage 12. This improves the heat exchange performance of the heat exchanger 18.

In the tank 1 of FIG. 1, instead of screwing the screws 21 into the screw holes 23 of the header 19 through the through holes 22 of the cap 7, the fastening of the heat exchange unit 16 to the cap 7 may be performed by screwing the screws 21 into screw holes formed in the cap 7 inserted through holes of the header 19.

In the tank 1 of FIG. 1, the heat exchange unit 16 may be fastened to the main body 5 rather than to the cap 7. For example, the heat exchange unit 16 may be fastened to the main body 5 by fixing the header 19 of the heat exchange unit 16 to the portion of the main body 5 corresponding to the basal end of the tank 1.

Figure 7A:
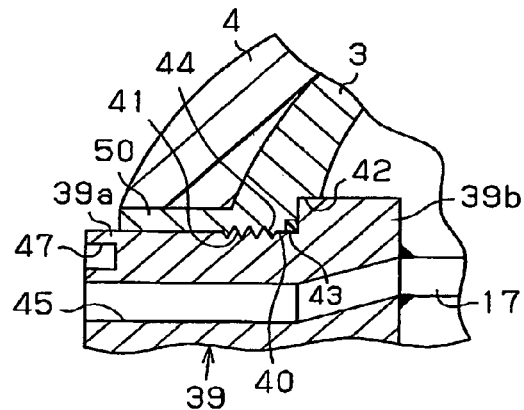
FIGS. 7(*a*) and 7(*b*), and FIGS. 8(*a*) and 8(*b*) are enlarged cross-sectional views respectively showing part of hydrogen storage tanks according to further embodiments of the present invention.

In the tank 1 shown in FIG. 4(a), the liner 3 may be provided with a cylindrical portion 50 surrounding the mounting hole 40 may extend outward from the liner 3, as shown in. FIG. 7. The shell 4 may cover the top of the cylindrical portion 50. This modification suppresses cracking of the portion of the liner 3 surrounding the mounting hole 40 that occurs due to the pressure difference between the inside and the outside of the accommodation chamber 2.

Figure 7B:
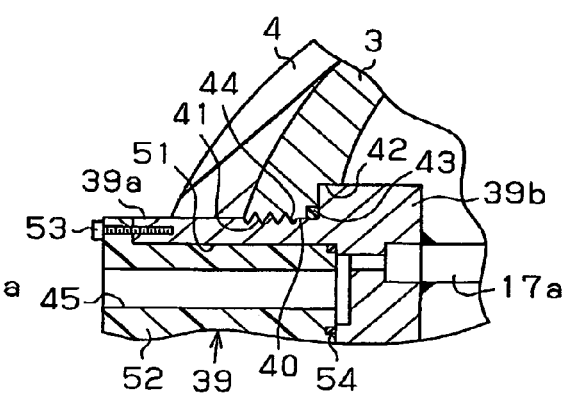

In the tank 1 of FIG. 4(a), instead of entirely forming the header 39 from metal, at least part of the header 39 defining the passages 45 and 46 in the header 39 may be formed of resin. In the modification shown in FIG. 7(b), an accommodating portion 51 is counter-bored in the distal end of the metal header 39. A resin plug 52, which forms part of the passages 45 and 46 (only the passage 45 is shown in FIG. 7(b)), is fixed to the accommodating portion 51 by a screw 53. In this case, a communication passage for connecting the passages 45 and 46 and the heat transfer tube 17 is formed in the metal header 39, and a seal ring 54 for preventing leakage of the heat transfer media is arranged between the plug 52 and the metal header 39. This modification suppresses heat exchange between the heat transfer media and the exterior when the heat transfer media passes through the passages 45 and 46 and improves the heat exchange performance of the heat exchanger 18. Moreover, the weight of the header 39 is reduced. In this modification, the liner 3 may have the cylindrical portion 50.

Figure 8A:
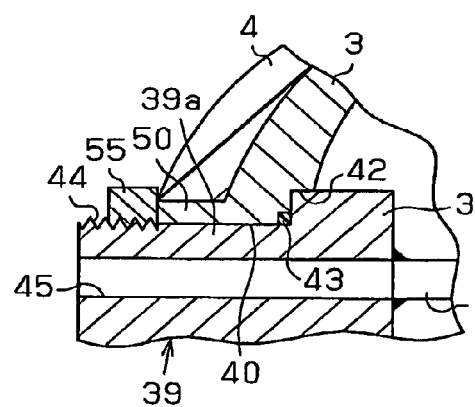
Figure 8B:
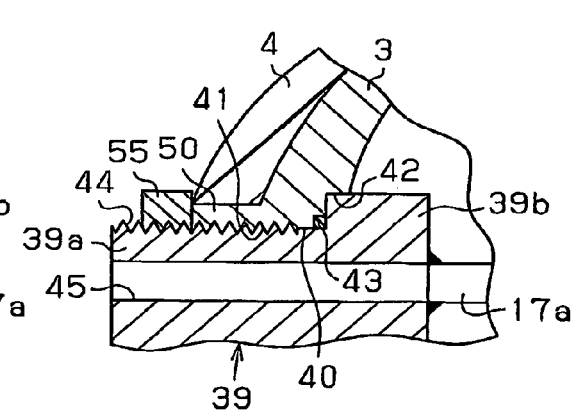

In the tank 1 of FIG. 4(a), the header 39 may be fixed to the liner 3 using a nut. For example, in the modification shown in FIG. 8(a), the female thread 41 and male thread 44 are omitted. A male thread 44 is formed on the part of the small diameter portion 39a projecting out of the mounting hole 40. The header 39 is fixed to the liner 3 by screwing a nut 55 on the projecting part of the small diameter portion 39a. In this modification, it is not necessary to rotate the header relative to the liner 3 when fastening the heat exchange unit 16 to the liner 3. Accordingly, the heat exchange unit 16 is easily fastened to the liner 3. In the modification shown in FIG. 8(b), a male thread 44 is formed on most of the circumferential surface of the small diameter portion 39a. The male thread 44 of the small diameter portion 39a engages both the female thread 41, which is formed in the surface of the liner 3 defining the mounting hole 40, and the nut 55, which is fastened to the part of the small diameter portion 39a projecting from the mounting hole 40. This modification ensures that the header 39 does not easily loosen. In the modifications in which the header 39 is attached to the liner 3 by a nut, the liner 3 need not have the above mentioned cylindrical portion 50.

In the tank 1 shown in FIG. 4(a), the concavities 47 need not be formed on the distal end surface of the small diameter portion 39a and may be formed anywhere on the part of the small diameter portion 39a projecting outward from the mounting hole 40. For example, the concavities 47 may be provided on the circumferential surface of the small diameter portion 39a projecting out of the mounting hole 40.

In the tank 1 of FIG. 4(a), the concavities 47 may be omitted. In this case, when fastening the heat exchange unit 16 to the liner 3, a tool (not shown) may be engaged with the passages 45 and 46 instead of the concavities 47.

In the tank 1 of FIG. 4(a), when mounting the heat exchange unit 16 to the liner 3, the liner 3 may be rotated relative to the header 39 rather than rotating the header 39 relative to the liner 3.

In the tanks 1 shown in FIGS. 1, 3, and 4(a), the basal end of the tank 1 may function as either one of the outlet or inlet of the heat transfer medium, and the distal end of the tank 1 may have the function as the other one of the outlet or inlet of the heat transfer medium. In other words, the basal end of the tank 1 does not have to provided with both functions.

In the tank 1 of FIG. 1, the number of heat transfer tubes 17 of the heat exchanger 10 may be two or less, or four or more. In this case, the quantity of the flow passages 25 and 27 formed in the header 19 is the same as the quantity of the heat transfer tubes 17.

In the tank 1 of FIG. 4(a), the number of heat transfer tubes 17 of the heat exchanger 18 may be two or more. In this case, the plurality of heat transfer tubes 17 may be connected to the two passages 45 and 46 of the header 39 or to passages 45 and 46, the quantity of which is the same as that of the heat transfer tubes 17.

In the tanks 1 shown in FIGS. 1, 3, and 4(a), the heat exchanger 18 incorporated in the liner 3 may be a fin assembly for discharging heat in the tank 1 through metal fins.

The present invention may be embodied in a pressure tank other than the hydrogen storage tank 1, for example, a tank for storing nitrogen and compressed natural gas.

In the tanks 1 shown in FIGS. 1, 3, and 4(a), the heat transfer medium may be a fluid other than water.

A fourth embodiment of the present invention will now be described with reference to FIGS. 9 and 10.

Figure 9:
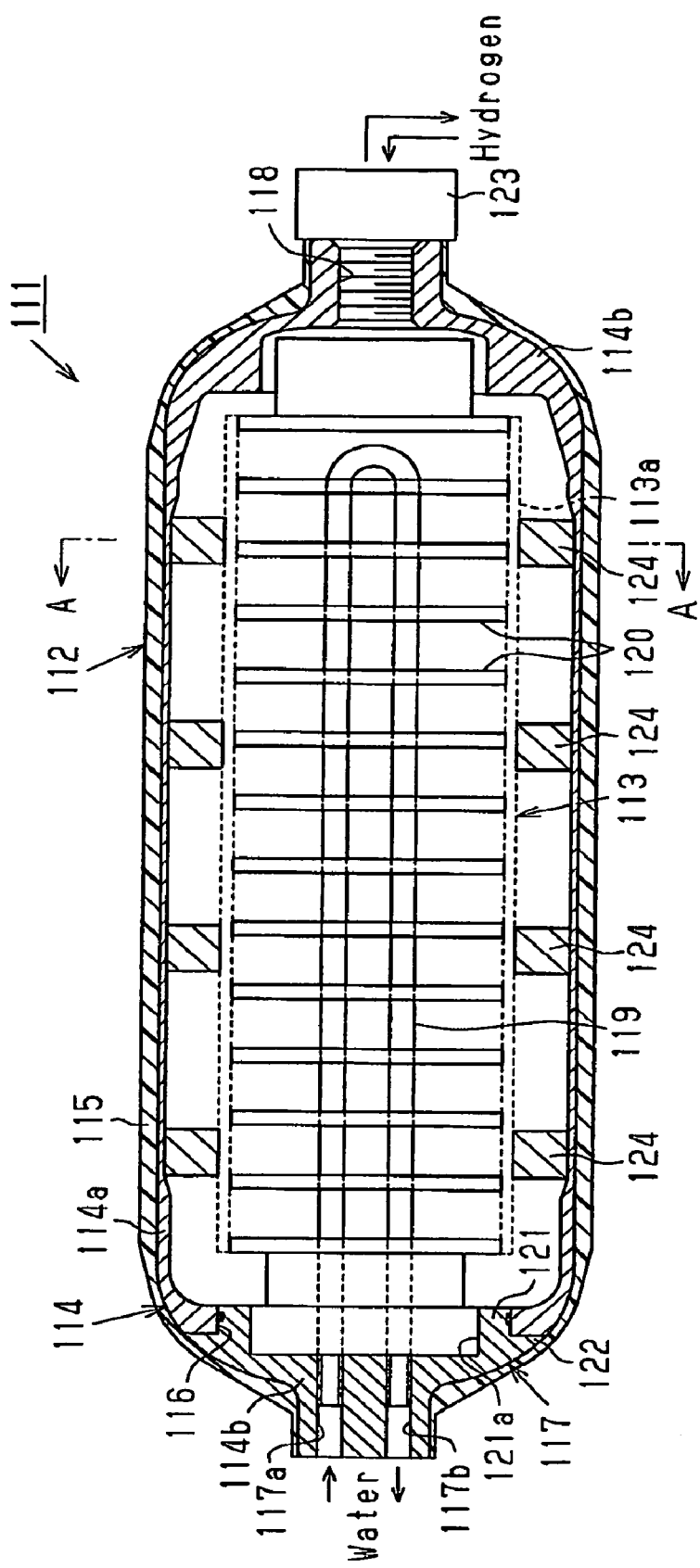
FIG. 9 is a cross-sectional view of a hydrogen storage tank according to a fourth embodiment of the present invention.
Figure 10:
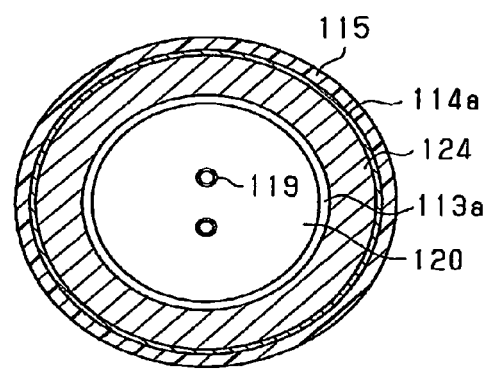
FIG. 10 is a cross-sectional view taken along line A—A line in the tank of FIG. 8.

A hydrogen storage tank 111 shown in FIGS. 9 and 10 is an elongated cylindrical pressure tank. As viewed in FIG. 9, the right end of the tank 111 defines a distal end and the left end of the tank 111 defines a basal end. The tank 111 includes a hollow tank body 112, which is generally cylindrical, and a hydrogen absorption unit 113 (an assembly provided with a heat exchange function) accommodated in the tank body 112.

The tank body 112 includes a liner 114 and a shell 115, which covers the entire outer surface of the liner 114. The liner 114 is formed of metal such as an aluminum alloy or the like and functions to ensure the hermetic seal of the tank 111. The liner 114 includes a cylindrical trunk 114a, and domes 114b formed at the ends of the trunk 114a. An opening 116 for inserting the hydrogen absorption unit 113 into the tank body 112 is provided in the part of the liner 114 corresponding to the basal end of the tank 111 (dome 114b). The opening 116 is closed by a cap 117, which is part of the liner 114. A gas passage 118 through which hydrogen is charged into the tank body 112 and discharged from the tank body 112 is formed in the part of the liner 114 corresponding to the distal end of the tank 111.

The shell 115 is formed of carbon fiber reinforced plastic (CFRP) and functions to ensure the durability (mechanical strength) of the tank 111. A carbon fiber bundle, which has been impregnated with a thermosetting resin such as unsaturated polyester resin, epoxy resin or the like, is wound around the liner 114 to form a helical winding layer and a hoop winding layer. Then, the resin impregnating the carbon fiber is solidified to form the shell 115.

The hydrogen absorption unit 113 is connected to the cap 117. The hydrogen absorption unit 113 includes a heat transfer tube 119 having a longitudinal axis parallel to the longitudinal (lateral direction in FIG. 9) of the tank 111. The heat transfer tube 119 is formed by pipe bent in a U-shaped manner. A plurality of disk-like fins 120 are arranged on the heat transfer tube 119 at equal intervals along the longitudinal direction of the tank 111. The heat transfer tubes 119 and the fins 120 form a heat exchanger. A hydrogen absorption alloy powder (not shown) is arranged in the gaps between the adjacent fins 120. Some of the hydrogen absorption alloy powder is in contact with the fins 120. A filter 113a, through which hydrogen passes, covers the fins 120 so that filter 113a holds the hydrogen absorption alloy powder between the fins 120. The hydrogen absorption unit 113 includes the heat transfer tube 119, the fins 120, the filter 113a, and hydrogen absorption alloy powder. A gap is provided between the outer surface of the filter 113a and the inner surface of the liner 114.

The cap 117 includes a cylindrical boss 121, which is inserted into the opening 116, and a flange 122, which extends from the periphery of the boss 121. A seal ring is arranged between the boss 121 and the surface of the liner 114 defining the opening 116. Passages 117a and 117b connected to the two ends of the heat transfer tube 119 are formed in the cap 117. Pipes extending from a heat transfer medium supply device (not shown) connected to the passages 117a and 117b. A heat transfer medium (cold water or warm water is supplied from the heat transfer medium supply device to the heat transfer tube 119 through the passage 117a and discharged from the heat transfer tube 119 through the passage 117b.

A receptacle 121a is formed in the end face of the boss 321. The basal end of the hydrogen absorption unit 113 is fitted in the receptacle 121a. In this state, The two ends of the heat transfer tube 119 are respectively inserted in The passages 117a and 117b. When warm water is supplied to the heat transfer tube 119 through the passage 117b, the hydrogen absorption alloy powder of the hydrogen absorption unit 113 is heated. When cold water is supplied to the heat transfer tube 119 through the passage 117a, the hydrogen absorption alloy powder is cooled.

A valve 123 is connected the gas passage 118. The valve 123 incorporates a regulator and is switched between a state in which the discharging of hydrogen from the tank body 112 through the gas passage 110 is permitted and a state in which the charging of hydrogen into the tank body 112 through the gas passage 118 is permitted. When hydrogen discharging is permitted, hydrogen charging into the tank body 112 through the gas passage 118 is prohibited. When hydrogen charging is permitted, hydrogen discharging from the tank body 112 through the gas passage 118 is prohibited. A seal ring is arranged between the end face of the liner 114 and the valve 123.

A plurality (four in the present embodiment) of ring support members 124 are arranged between the inner surface of the tank body 112 and the outer surface of the hydrogen absorption unit 113. The ring support members 124 are in contact with the inner surface of the tank body 112 and the outer surface of the hydrogen absorption unit 113 along the entire circumference of the ring support member 124. The ring support members 124 support the hydrogen absorption unit 113 in the tank body 112. Further, the ring support members 124 are formed of porous metal and have continuous pores. The porous metal forming the ring support members 124 may be, for example, Cermet, which is a commercial nickel-based porous metal manufactured by Sumitomo Electric Industries, Ltd. Since the ring support members 124 are formed of porous metal, stress exerted on the hydrogen absorption unit 113 during use is relieved by the deformation of the ring support members 124 even when the hydrogen absorption unit 113 expands. Although it is desirable that the porosity of the porous metal is 90% or greater, the maximum porosity differs depending on the strength and volume of the tank body 112 or depending on the amount of expansion of the hydrogen absorption unit 113.

The method for manufacturing the tank 111 will now be described.

When manufacturing the tank 111, first, when the ring support members 124 have been set at predetermined positions in the liner 114, the process of narrowing the basal end of the liner 114 is performed. Then, the liner 114 is subjected to heat treatment. Next, the hydrogen absorption unit 113 is connected to the cap 117. The cap 117, to which the hydrogen absorption unit 113 has been connected, is mounted on the liner 114 by bolts (not shown) so as to cover the opening 116. The liner 114 incorporating the hydrogen absorption unit 113 is prepared in this manner.

Then, using a filament winding device, carbon fibers impregnated with a thermosetting resin is wound around the liner 114 until a predetermined number of helical winding layers and hoop winding layers are formed. The hoop winding layer is mainly formed on the trunk 114a of the liner 114. Then, the liner 114 is heated in an oven to solidify the resin impregnating the carbon fiber. Thereafter, burrs are removed and the valve 123 is connected to the gas passage 118 to complete the tank 111.

The operation of the tank 111 when the tank 111 is installed in a electric fuel cell automobile will now be described.

In the tank 111 installed in an electric fuel cell automobile, pipes (not shown) extending from a heat transfer medium supply unit are connected to the passages 117a and 117b. Further, a pipe (not shown) extending from a fuel cell is connected to the valve 123. Hydrogen is stored in the tank body 112 in a pressurized state.

In the state in which the valve 123 permits the discharge of hydrogen from the tank body 112, if hydrogen is consumed at a fuel cell electrode, hydrogen is discharged from the tank body 112 through the gas passage 118 and supplied to the fuel cell electrode to replenish insufficient hydrogen. When the hydrogen is discharged from the tank body 112, the hydrogen absorption alloy powder of the hydrogen absorption unit 113 discharges hydrogen by means of a hydrogen discharge reaction. Since the hydrogen discharge reaction of the hydrogen absorption alloy powder is an endothermic reaction, as long as the heat necessary for the discharge of the hydrogen is not supplied from the heat transfer medium, the hydrogen absorption alloy powder consumes its own sensible heat and discharges hydrogen. As a result, the temperature of the hydrogen absorption alloy powder decreases. When the temperature of the hydrogen absorption alloy powder decreases, the speed of the hydrogen discharge reaction is reduced. However, in the tank 111 of the present embodiment, when hydrogen is discharged from the tank body 112, warm water is supplied to the heat transfer tube 119 through the passage 117a. The warm water flowing through the heat transfer tube 119 suppresses the decrease in temperature of the hydrogen absorption alloy powder through the fins 120. Therefore, the hydrogen absorption reaction of the hydrogen absorption alloy powder progresses smoothly. When the fuel cell electrode further continues consumption, the hydrogen discharged from the hydrogen absorption alloy powder is continuously discharged from the tank body 112 through the gas passage 118.

When charging hydrogen into the tank body 112, the hydrogen is charged into the tank body 112 through the gas passage 118 after the valve 123 is switched Lo permit charging of hydrogen into the tank body 112. The hydrogen charged into the tank body 112 is absorbed by the hydrogen absorption alloy powder by the hydrogen absorption reaction of the hydrogen absorption alloy powder. Since the hydrogen absorption reaction is an exothermic reaction, as long as the heat generated by the hydrogen absorption reaction is not eliminated, the temperature of the hydrogen absorption alloy powder increases. When the temperature of the hydrogen absorption alloy powder increases, the speed of the hydrogen absorption reaction is reduced. In the tank 111 of the present embodiment, when hydrogen is charged into the tank body 112, cold water is supplied to the heat transfer tube 119 through the passage 117a. The cold water flowing through the heat transfer tube 119 suppresses and increases the temperature of the hydrogen absorption alloy powder through the fins 120. Therefore, the hydrogen absorption reaction of the hydrogen absorption alloy powder progresses smoothly.

The fourth embodiment has the advantages described below.

The hydrogen absorption unit 113 in the tank body 112 is cantilever supported on the cap 117 when the two ends of the heat transfer tube 119 are respectively inserted into the passages 117a and 117b. Accordingly, if the ring support members 124 were not present, a large load would be applied to the cap 117 and the two ends of the heat transfer tube 119. However, since the tank 111 of the present embodiment has the ring support members 124, which support the hydrogen absorption unit 113 at parts other than the two ends of the heat transfer tube 119, the weight of the hydrogen absorption unit 113 is dispersed to the ring support members 124. Accordingly, the cap 117 and the two ends of the heat transfer tube 119 need not be rigid. This contributes to reducing the weight of the cap 117.

Since the ring support members 124 are formed of a porous metal having continuous pores, the ring support members 124 are riot deformed even when the pressure changes within the tank body 112. Although there is concern that when the hydrogen absorption unit 113 (hydrogen absorption alloy powder) expands, the stress caused by the expansion may act on the tank body 112 through the ring support members 124. However, such stress is relieved by the deformation of the ring support members 124. Accordingly, the strength of the tank body 112 is sufficient as long as it is about the same as a conventional hydrogen storage tank. Furthermore, although the apparent volume of the ring support members 124 may seem large, space capable of storing a sufficient amount of hydrogen within the tank body 112 is ensured since the ring support members 124 are formed of porous metal have continuous pores. This contributes to both reducing the weight of the tank 111 and ensuring the capacity of the tank 111.

The ring support members 124 are in contact with the inner surface of the tank body 112 and the outer surface of the hydrogen absorption unit 113 along the entire circumference of the ring support member 124. Therefore, the hydrogen absorption unit 113 is supported in the tank body 112 by the ring support members 124 in a satisfactory manner even when the tank 111 is swung in the radial direction. Thus, the tank 111 operates in a satisfactory manner when installed in an automobile. When the tank 111 is used in a stationary state not installed in an automobile, the ring support members 124 may be replaced by support members that support the lower side of the hydrogen absorption unit 113 since the tank 111 will not be swung in the radial direction (refer to FIG. 11). The support members must be arranged at positions that enable secure supporting of the hydrogen absorption unit 113 when the tank 111 is used. When using the ring support members 124, the ring support members 124 may be arranged at any position.

The hydrogen absorption unit 113 is accommodated in the liner 114 after the liner 114 has been subjected to the drawing process and heating treatment. Accordingly, the hydrogen absorption unit 113, and particularly the hydrogen absorption alloy powder, is not deformed by the heat treatment of the liner 114.

The tank body 112 is formed by the metal liner 114 and the CFRP shell 115. Therefore, the tank body 112 is light compared to a tank body completely made of metal.

In the tank 111 shown in FIG. 9, the inlet and outlet of the heat transfer media of the heat transfer tube 119 are provided at the basal end of the tank 111, and the inlet and outlet of the hydrogen in Lie tank body 112 are provided at the distal end of the tank 111. The structure of the tank 111 would become more complicated if the inlets and outlets of both the hydrogen and the heat transfer media were to be provided at either one of the distal and basal ends of the tank 111. In comparison, the tank 111 shown in FIG. 9 has a relatively simple structure.

The valve 123 incorporates a regulator, and is switched between a state in which the discharging of hydrogen from the tank body 112 through the gas passage 110 is permitted and a state in which the charging of hydrogen into the tank body 112 through the gas passage 118 is permitted. Therefore, a separate regulator for switching between hydrogen discharging and hydrogen charging is not necessary for the tank 111. Thus, the tank 111 occupies less space when installed in an automobile.

The fourth embodiment may be modified as described below.

The ring support members 124 may be replaced by non-ring support members which support the hydrogen absorption unit 113 in the same way as the ring support members 124. For example, arcuate support members may be provided at equal intervals in the circumferential direction of the tank body 112. In this case, the hydrogen absorption unit 113 is securely supported in the tank body 112 by the support members even when the tank 111 is swung in the radial direction. In the case of the ring support members 124, the ring support members 124 must be arranged at predetermined positions within the liner 114 before the liner 114 is subjected to the drawing process. However, when non-ring support members are used, the support members may be arranged at predetermined positions within the liner 114 through the opening 116 even after both ends of the liner 114 have been subjected to the drawing process.

Figure 11:
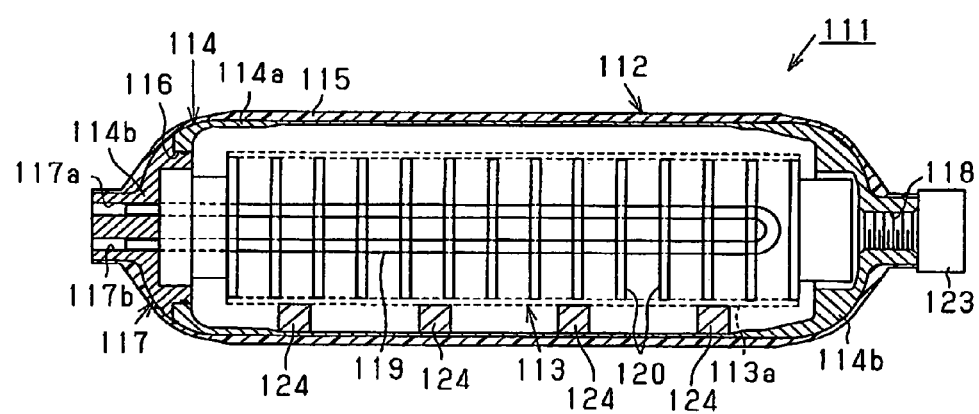
FIG. 11 is a cross-sectional view of a hydrogen storage tank according to a further embodiment of the present invention.
Figure 12:
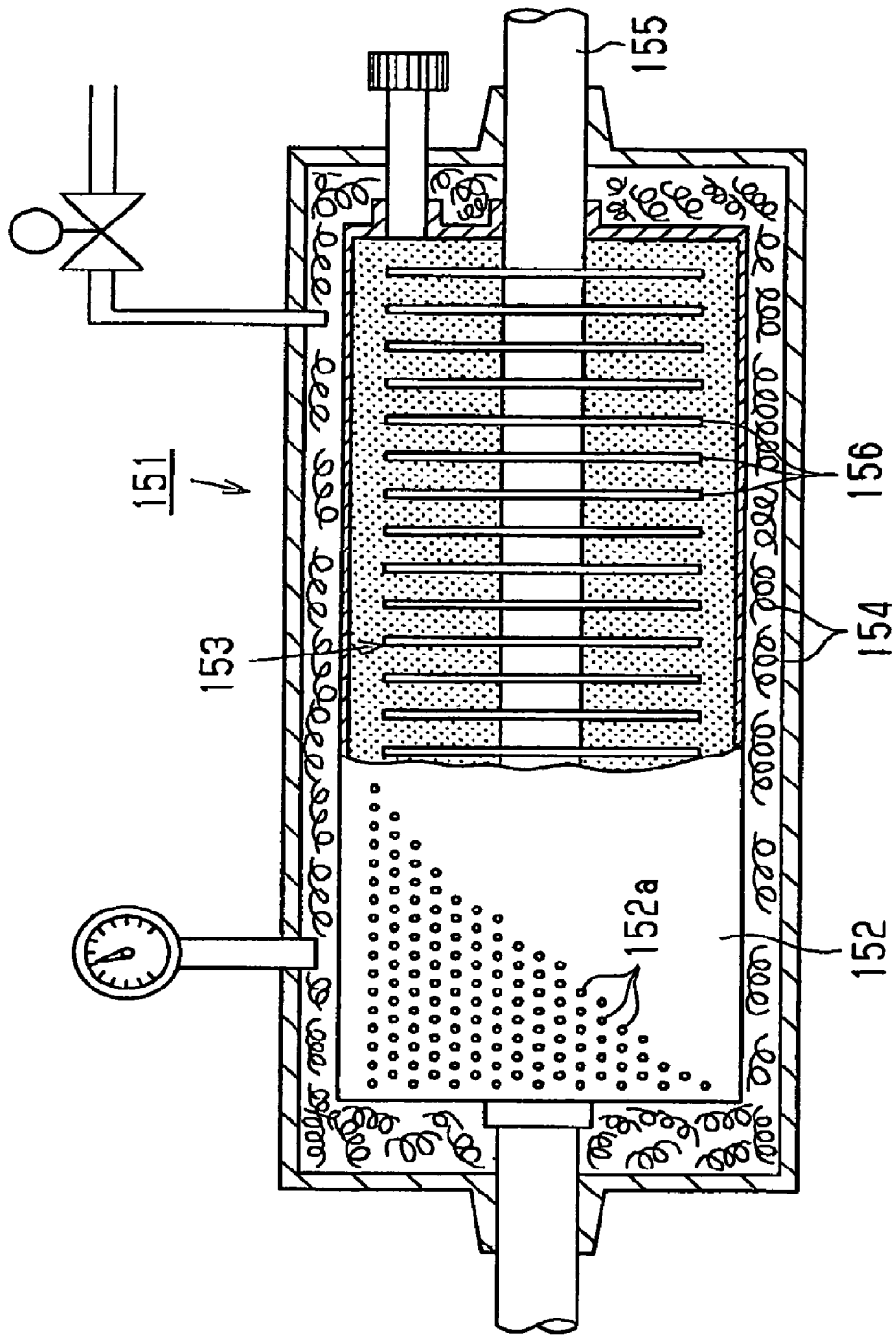
FIG. 12 is a cross-sectional view of a conventional hydrogen storage tank.

As shown in FIG. 11, the ring support members 124 may be replaced by non-ring support members 124 which only provide support from beneath the hydrogen absorption unit 113. These support members 124 may be arranged at predetermined positions within the liner 114 through the opening 116 even after the liner 114 has been subjected to the drawing process.

Although the shape of the hydrogen absorption unit 113 is approximately cylindrical in the embodiments, the hydrogen absorption unit 113 may have a non cylindrical shape, such as a square column or the like. If the fins 120 are square plates, the shape of the hydrogen absorption unit 113 may be a square column, and if the fins 120 are hexagonal plates, the shape of the hydrogen absorption unit 113 may be a hexagonal column.

The ring support members 124 may not have continuous pores as far as having an air hole, which enables gas (fluid) to pass through, passing through the ring support member 124.

The fins 120 may be omitted. Further, the filter 113a may accommodate hydrogen absorption alloy powder or a molded hydrogen absorption alloy product.

The tank 111 is not limited to the use of supplying hydrogen to a electric fuel cell automobile, and may be used to supply hydrogen to a hydrogen engine automobile, used as a heat pump, or used to supply hydrogen to the fuel cell of a household power supply.

The present invention may be embodied in a pressure tank other than the hydrogen storage tank 111, for example a tank for storing nitrogen and compressed natural gas.

The shell 115, rather than being formed by carbon fiber reinforced plastic (CFRP), may be formed by plastic reinforced by fiber other than carbon fiber such as glass fiber, carbon-silicon ceramic fiber, and aramide fiber.

The liner 114, rather than being formed by metal, may be formed by a synthetic resin such as polyamide, high-density polyethylene and the like. When the liner 114 is formed of a metal other than aluminum alloy, the metal other than aluminum alloy desirably has a specific gravity that is about the same as aluminum.

The tank body 112 may be completely formed of metal.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A pressure tank comprising:
   a hollow liner, the liner being separable into at least two separate bodies;
   a shell for covering the outer surface of the liner, the shell being formed of a fiber reinforced plastic;
   a heat exchanger arranged in the liner;
   a header connected to the heat exchanger, the heat exchanger being supported on the liner by fastening the header to one of the separate bodies,
   wherein the fastening of the header to one of the separate bodies is performed by screws which penetrate through one of the separate bodies into the header.

2. The pressure tank of claim 1, wherein the heat exchanger and the header are aligned along the axis of the pressure tank.

3. The pressure tank of claim 1, wherein the liner includes a passage connecting the interior of the liner to the exterior of the pressure tank, and the header includes a flow passage extending through the header, the header being fastened to one of the separate bodies such that the flow passage is connected to the passage, and the heat exchanger includes a heat transfer tube for circulating a heat transfer medium inside the tube, the heat exchanger being connected to the header such that the inside of the heat transfer tube is connected to the flow passage.

4. The pressure tank of claim 3, further comprising a seal ring pressed against both the header and the liner when the header is fastened to one of the separate bodies, the seal ring preventing gas from flowing between the interior of the liner and the inside of the heat transfer tube.

5. The pressure tank of claim 3, wherein the pressure tank is cylindrical and has a first end and a second end in the axial direction of the pressure tank, and the heat transfer medium is supplied to the heat transfer tube at the first end of the pressure tank and discharged from the heat transfer tube at the same first end.

6. The pressure tank of claim 5, wherein gas enters and exits at the second end of the pressure tank when gas is charged into the pressure tank and when gas is discharged from the pressure tank.

7. The pressure tank of claim 3, wherein the heat exchanger further includes at least one other heat transfer tube for circulating a heat transfer medium inside the tube, the inside of the at least one other heat transfer tube is connected to the flow passage when the heat exchanger is connected to the header.

* * * * *

UNITED STATES PATENT AND TRADEMARK OFFICE
CERTIFICATE OF CORRECTION

PATENT NO. : 7,152,665 B2
APPLICATION NO. : 10/841279
DATED : December 26, 2006
INVENTOR(S) : Keiji Toh et al.

It is certified that error appears in the above-identified patent and that said Letters Patent is hereby corrected as shown below:

Column 1, line 1, please delete "tank;" and insert therefore -- tank. --;

Column 1, line 67, please delete "mariner" and insert therefore -- manner --;

Column 2, lines 33-34, please delete "adjusted regulate" and insert therefore -- adjusted to regulate --;

Column 3, line 67, please delete "line in the tank of FIG. 8;" and insert therefore -- in the tank of FIG. 9 --;

Column 4, line 41, please delete "which for" and insert therefore -- for --;

Column 4, line 46, please delete "Lo" and insert therefore -- to --;

Column 5, line 58, please delete "26 and 20" and insert therefore -- 26 and 28 --;

Column 7, line 65, please delete "exception for" and insert therefore -- exception of --;

Column 9, line 52, please delete "less the" and insert therefore -- less than the --;

Column 10, line 12, please delete "cap/closing" and insert therefore -- cap 7 closing --;

Column 10, line 60, please delete "40 may extend" and insert therefore
-- 40, extending --;

Column 11, line 62, please delete "exchanger 10" and insert therefore
-- exchanger 18 --;

UNITED STATES PATENT AND TRADEMARK OFFICE
CERTIFICATE OF CORRECTION

PATENT NO.         : 7,152,665 B2
APPLICATION NO. : 10/841279
DATED                  : December 26, 2006
INVENTOR(S)        : Keiji Toh et al.

It is certified that error appears in the above-identified patent and that said Letters Patent is hereby corrected as shown below:

Column 13, line 5, please delete "connected" and insert therefore -- connect --;

Column 13, lines 6-7, please delete "(cold water or warm water is" and insert therefore -- cold water or warm water) is --;

Column 13, lines 11-12, please delete "boss 321." and insert therefore -- boss 121. --;

Column 13, line 13, please delete "state, The" and insert therefore -- state, the --;

Column 13, line 14, please delete "inserted in The" and insert therefore -- inserted in the --;

Column 13, line 21, please delete "connected the" and insert therefore -- connected to the --;

Column 13, line 24, please delete "gas passage 110" and insert therefore -- gas passage 118 --;

Column 14, line 52, please delete "Lo" and insert therefore -- to --;

Column 15, line 22, please delete "riot" and insert therefore -- not --;

Column 16, line 1, please delete "in Lie tank body 112" and insert therefore -- in the tank body 112 --;

Column 16, line 10, please delete "gas passage 110" and insert therefore -- gas passage 118 --; and

UNITED STATES PATENT AND TRADEMARK OFFICE
CERTIFICATE OF CORRECTION

PATENT NO.        : 7,152,665 B2
APPLICATION NO.   : 10/841279
DATED             : December 26, 2006
INVENTOR(S)       : Keiji Toh et al.

It is certified that error appears in the above-identified patent and that said Letters Patent is hereby corrected as shown below:

Column 16, line 45, please delete "non cylindrical shape," and insert therefore
-- non-cylindrical shape, --.

Signed and Sealed this

Eighteenth Day of August, 2009

David J. Kappos
*Director of the United States Patent and Trademark Office*